United States Patent [19]

Sherman et al.

[11] Patent Number: 5,197,355
[45] Date of Patent: Mar. 30, 1993

[54] POWER TRANSMISSION AND CONTROL

[75] Inventors: James F. Sherman, Brighton; Paul D. Stevenson, Ann Arbor, both of Mich.

[73] Assignee: General Motors Corporation, Detroit, Mich.

[21] Appl. No.: 901,474

[22] Filed: Jun. 19, 1992

[51] Int. Cl.$^5$ .............................................. F16H 61/00
[52] U.S. Cl. ...................................................... 74/866
[58] Field of Search ............................................ 74/866

[56] References Cited

U.S. PATENT DOCUMENTS 4,933,859  6/1990  Ysnyama et al. ................. 74/866 X
5,022,286  6/1991  Takizawa ............................. 74/866
5,052,531  10/1991  Bota ................................. 74/866 X Primary Examiner—Dirk Wright
Attorney, Agent, or Firm—Donald F. Scherer

[57] ABSTRACT

A power transmission has a selectively controlled two-speed, underdrive and direct drive, planetary mechanism disposed between a torque converter and a multi-speed gear arrangement. A control for the two-speed planetary mechanism responds to vehicle operating parameters, such as throttle and brake, for establishing the selection of the ratio condition in the two-speed planetary mechanism.

2 Claims, 4 Drawing Sheets

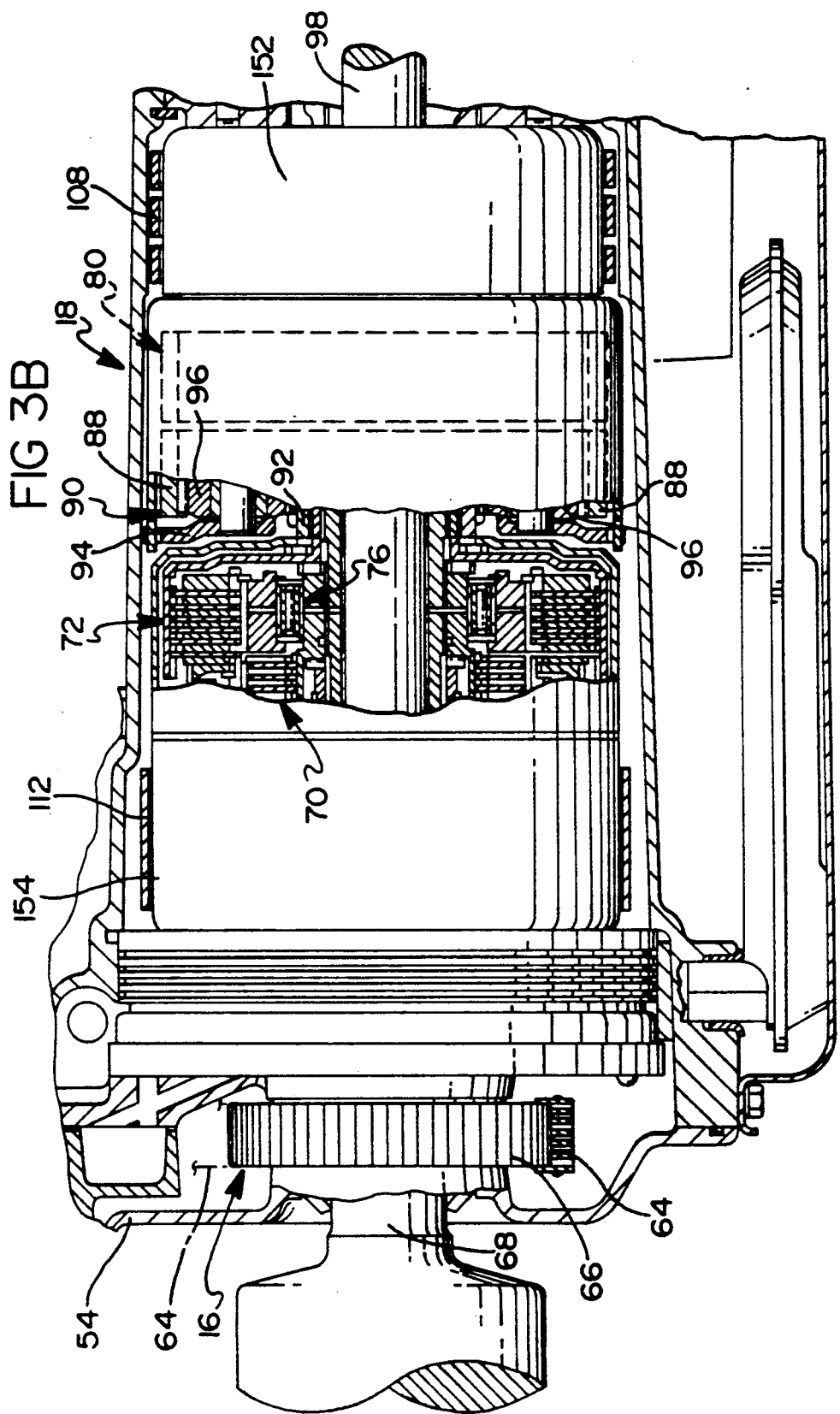

5,197,355

POWER TRANSMISSION AND CONTROL

BACKGROUND OF THE INVENTION

This invention relates to power transmission, and more particularly, to engine driven power transmissions having means for controlling the overall torque ratio of the transmission.

Specifically, this invention relates to engine driven multi-speed power transmissions having an added two-speed planetary for extending the torque range of the transmission.

When an underdrive ratio is added to a multi-speed planetary gear arrangement to provide increased output torque in the low range, particularly in a transverse front wheel drive, the underdrive is usually added to the output of the transmission so that the increased torque is not transmitted by the other gear members of the transmission. This approach is used so that the gear, shafts, etc., do not need to be redesigned for the increased torque. This results in an increased overall length for the transmission. Thus, the space required for the transmission is increased.

When the length of the transmission is critical, the alternative has been to place the underdrive set between the engine and transmission on the engine axis. However, this requires that power transmitting elements, such as gears and shafts, etc., of the main transmission be increased in size to accommodate the maximum torque that can be transmitted.

The maximum torque which can be delivered to the drive axle is the torque required to slip the drive wheels plus the brake torque. This maximum torque condition occurs when the vehicle is stationary with the engine throttle substantially fully opened to demand maximum engine torque and the operator has the brakes applied to prevent wheel slip. Under this condition, the torque converter is operating at the stall point which is the maximum torque ratio operating condition. Thus, it should be appreciated that significant torque levels can be attained in the transmission.

However, torque levels that will cause the tires to slip, in the absence of brake forces, are not useful in propelling the vehicle. Accordingly, the transmission gears, shafts, etc., are sized significantly greater than what is useful in order to accommodate a rarely achieved maximum torque conditioning.

SUMMARY OF THE INVENTION

The present invention overcomes the disadvantages of the prior art by providing a control that limits the input torque to the design value of the multi-speed transmission prior to the addition of a two-speed planetary between the engine and the multi-speed arrangement.

The two-speed planetary is controlled to be in a direct drive condition whenever specific operating parameters or conditions are present. For example, when the throttle setting is greater than a predetermined percentage of maximum throttle and the vehicle brakes are applied, the direct drive condition in the underdrive gear set is established. Also, the two-speed planetary can be conditioned for direct drive whenever the drive wheels exhibit a predetermined slip condition relative to the nondrive wheels.

It is therefore an object of this invention to provide an improved transmission and control wherein a selectively operable two-speed planetary gear arrangement is disposed between a torque converter and a multi-speed transmission to provide increased torque range, and wherein the two-speed planetary is controlled to a direct drive when predetermined vehicle operating parameters indicate the input torque to the multi-speed transmission will exceed a predetermined value.

It is another object of this invention to provide an improved transmission and control having an added planetary arrangement to provide an increased torque range, wherein the added planetary is controlled to limit the maximum torque ratio of the transmission in response to predetermined operating conditions and parameters.

These and other objects and advantages of the present invention will be more apparent from the following specification and drawings.

DESCRIPTION OF THE DRAWINGS

FIGS. 3A and 3B are elevational views, partly in section, of a transmission incorporating the present invention.

DESCRIPTION OF THE PREFERRED EMBODIMENT

Figure 1:
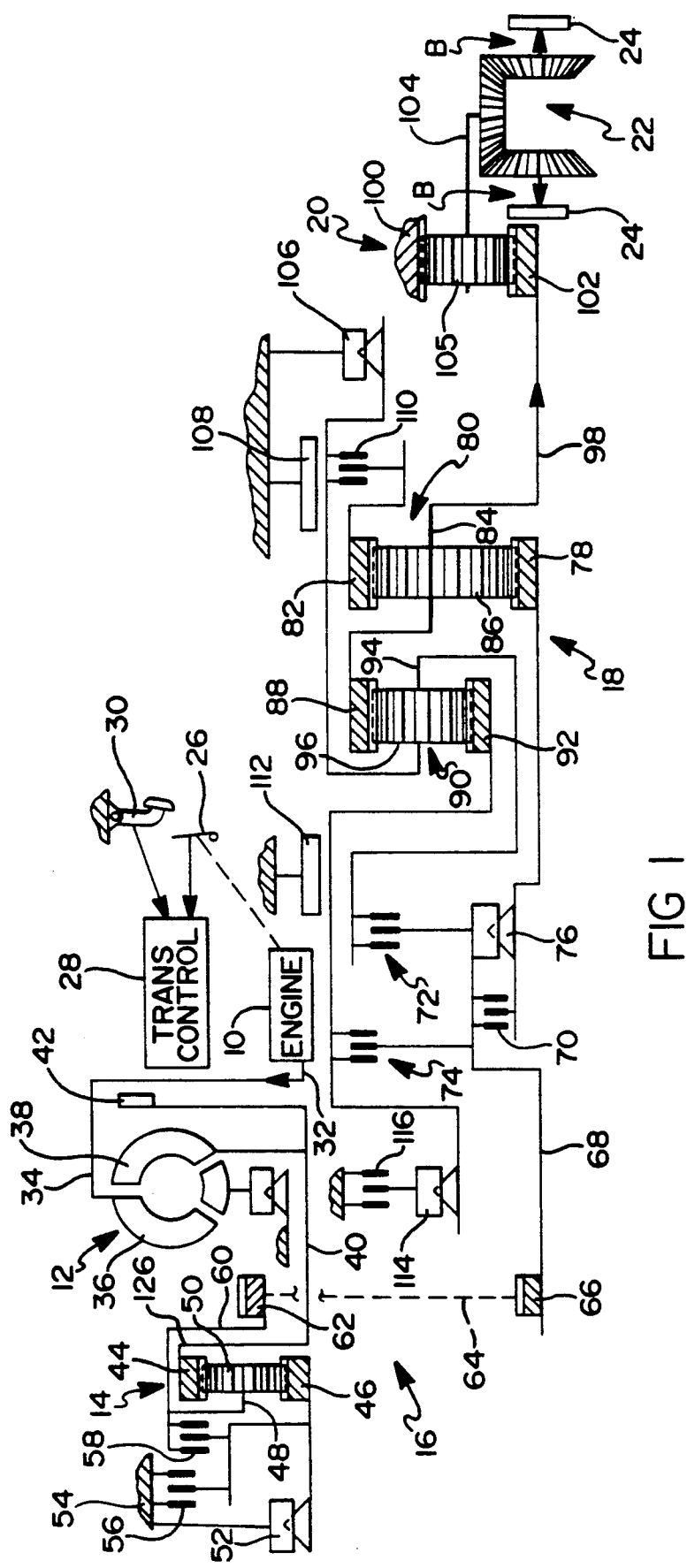
FIG. 1 is a schematic representation of a vehicle powertrain incorporating the present invention.

Referring to the drawings, wherein like characters represent the same or corresponding parts throughout the several views, there is seen in FIG. 1 a vehicle powertrain comprised of an engine 10, drivingly connected to a torque converter 12 which, in turn, is drivingly connected to a two-speed planetary gear arrangement 14. A fixed ratio chain drive 16 connects the two-speed planetary gear arrangement 14 with a multi-speed planetary gear arrangement 18 which, in turn, is drivingly connected through a final drive ratio 20 to a differential gear mechanism 22 which, in turn, is drivingly connected to a pair of drive wheels 24.

The engine 10 is a conventional internal combustion engine having a manual throttle control 26 which is adapted to control the output torque of the engine 10. The throttle control 26 is also connected to a conventional transmission control 28 which, as is well known, can provide pressurized fluid to control the operating condition of the transmission in response to various operating parameters which include the vehicle speed, throttle setting, temperature, condition of the vehicle brakes and other parameters.

An operator brake 30 is provided which delivers a brake signal to the transmission control 28 and will simultaneously transmit a braking force to the drive wheels 24 and to the nondrive wheels of the vehicle which are not shown.

The engine 10 has an output shaft 32 which is connected through a flexplate and hub 34 to drive a conventional torque converter impeller 36. The impeller 36 drives a turbine 38 in a well known manner which, in turn, drives a torque converter output shaft 40. A torque converter clutch 42 is also incorporated to selectively provide a direct drive connection between the engine 10 and the shaft 40.

The torque converter output shaft 40 is drivingly connected with a ring gear 44 which is a member of the two-speed planetary gear arrangement 14. The two-speed planetary gear arrangement 14 is also comprised of a sun gear 46, a carrier 48 and pinion gears 50, which are rotatably mounted on the carrier 48, and mesh with sun gear 46 and ring gear 44. The sun gear 46 is operatively connected through a conventional one-way device 52 to a transmission casing or housing 54.

As is well known, the one-way device 52 will hold the sun gear 46 stationary in one direction to provide a reaction for the two-speed planetary gear 14 resulting in an underdrive output from the carrier 48. Disposed in parallel with the one-way device 52 is a fluid-operated selectively engageable friction brake 56 which can be selectively controlled to provide a positive brake function for the sun gear 46.

The carrier 48 and sun gear 46 can be selectively interconnected by a conventional fluid-operated friction clutch 58, such that a 1:1 drive is provided through the planetary gear arrangement 14. The carrier 48 is drivingly connected through a hub 60 to a sprocket 62 which is a component of the fixed ratio chain drive 16. The chain drive 16 also includes a conventional toothed chain member 64 and a second sprocket 66. The sprocket 66 is drivingly connected to a transmission input shaft 68 which has operatively connected therewith three conventional fluid-operated friction clutches 70, 72 and 74. Also operatively connected with the shaft 68 is a conventional one-way device 76.

The fluid-operated clutch 70 and one-way device 76 are drivingly connected to a sun gear 78 which is a member of a rear planetary arrangement 80 of the multi-speed planetary gear arrangement 18. The planetary gear arrangement 80 also includes a ring gear 82, a carrier 84 and pinion gears 86 rotatably mounted on the carrier 84 and disposed in meshing relation with the sun gear 78 and ring gear 82. The carrier 84 is connected to a ring gear 88 which is a member of a forward planetary gear arrangement 90 which is also part of the multi-speed planetary gear arrangement 18.

The planetary gear arrangement 90 includes a sun gear 92, a carrier 94 and pinion gears 96 rotatably supported on the carrier 94 and disposed in meshing relation with the ring gear 88 and sun gear 92. The carrier 84 is also drivingly connected along with the ring gear 88 to a transmission output shaft 98 which, in turn, is drivingly connected with the final drive arrangement 20.

The final drive arrangement 20 includes a ring gear 100 secured to the transmission casing 54, a sun gear 102 connected with shaft 98, a carrier 104 and pinion gears 105 rotatably mounted on the carrier 104 and disposed in meshing engagement with the sun gear 102 and ring gear 100. The carrier 104 is drivingly connected with and provides an input drive to the conventional differential gear arrangement 22. The fluid-operated friction clutches 72 and 74 are connected with the carrier 94 and sun gear 92, respectively. The clutches 70, 72 and 74, and one-way device 76, are selectively operable to provide input drives to the multi-speed planetary gear arrangement 18, as directed by the transmission control 28 in a well known manner.

To establish various ratios within the multi-speed planetary arrangement 18, a plurality of selectively engageable friction devices and one-way devices are provided. The carrier 92 is operatively connected with a conventional one-way device 106, a fluid-operated band brake 108 and a selectively engageable friction clutch 110.

The sun gear 92 is operatively connected with a fluid-operated band brake 112 and a serially arranged one-way device 114 and fluid-operated disc brake 116. Selective actuation of the various friction devices will result in the selective establishment of four forward ratios and one reverse ratio in the multi-speed planetary gear arrangement 18. For example, in the forward gears, first through third, the one-way clutch 76 will be active along with the selectively engageable friction clutch 110 to establish a first or low speed ratio through cooperation of the one-way device 106. The second forward speed ratio is established by the engagement of the friction brake 116 and the third forward speed ratio is established by the engagement of the friction clutch 72.

In each of the ratio changes, i.e., first to second, a one-way device is present to control shift timing. However, positive friction brakes can also be provided during the first ratio or the second ratio. Braking during these ratios would be provided by the band brakes 108 and 112, respectively. It should also be appreciated, that the friction clutch 70 can be engaged to provide a positive drive connection between the shaft 68 and the sun gear 78. Thus, engine braking during coast operation is possible.

To establish a fourth forward drive ratio, the band brake 112 is engaged and the one-way device 76 will effectively disconnect sun gear 78 from the input shaft 68. This will establish an overdrive ratio in the planetary gear set 90. The reverse ratio is established by engaging the clutch 74 and the band brake 108.

The multi-speed planetary gear arrangement 18 is designed to have a torque ratio during the low gear, which when combined with the torque converter, will transmit torque sufficient to slip the drive wheels of the vehicle without imposing excess stress conditions on the various clutches and gear members of the transmission or final drive ratio. The maximum torque that can be applied, i.e., brake torque added to prevent wheel slip, is not significantly greater than the wheel slip torque.

In order to extend the torque range of the powertrain and permit an increased low speed torque ratio, the two-speed planetary gear arrangement 14 is disposed between the torque converter 12 and the multi-speed planetary gear arrangement 18. With the added torque ratio of the planetary gear arrangement 14, it is possible to exceed the design stress limits of the multi-speed planetary gear arrangement 18. This condition could occur at predetermined throttle conditions, for example, 60% of throttle with the vehicle brake 30 applied to prevent tire slip of the drive wheels 24.

It has been found that this increased torque transmission can be limited by the transmission control by upshifting the two-speed planetary gear arrangement 14 from the low ratio to the direct drive ratio. With the two-speed planetary gear arrangement 14 in the direct drive ratio, the input torque to the multi-speed planetary gear arrangement 18 would not be greater than the original design torque and therefore the design stresses would not be exceeded.

Figure 2:
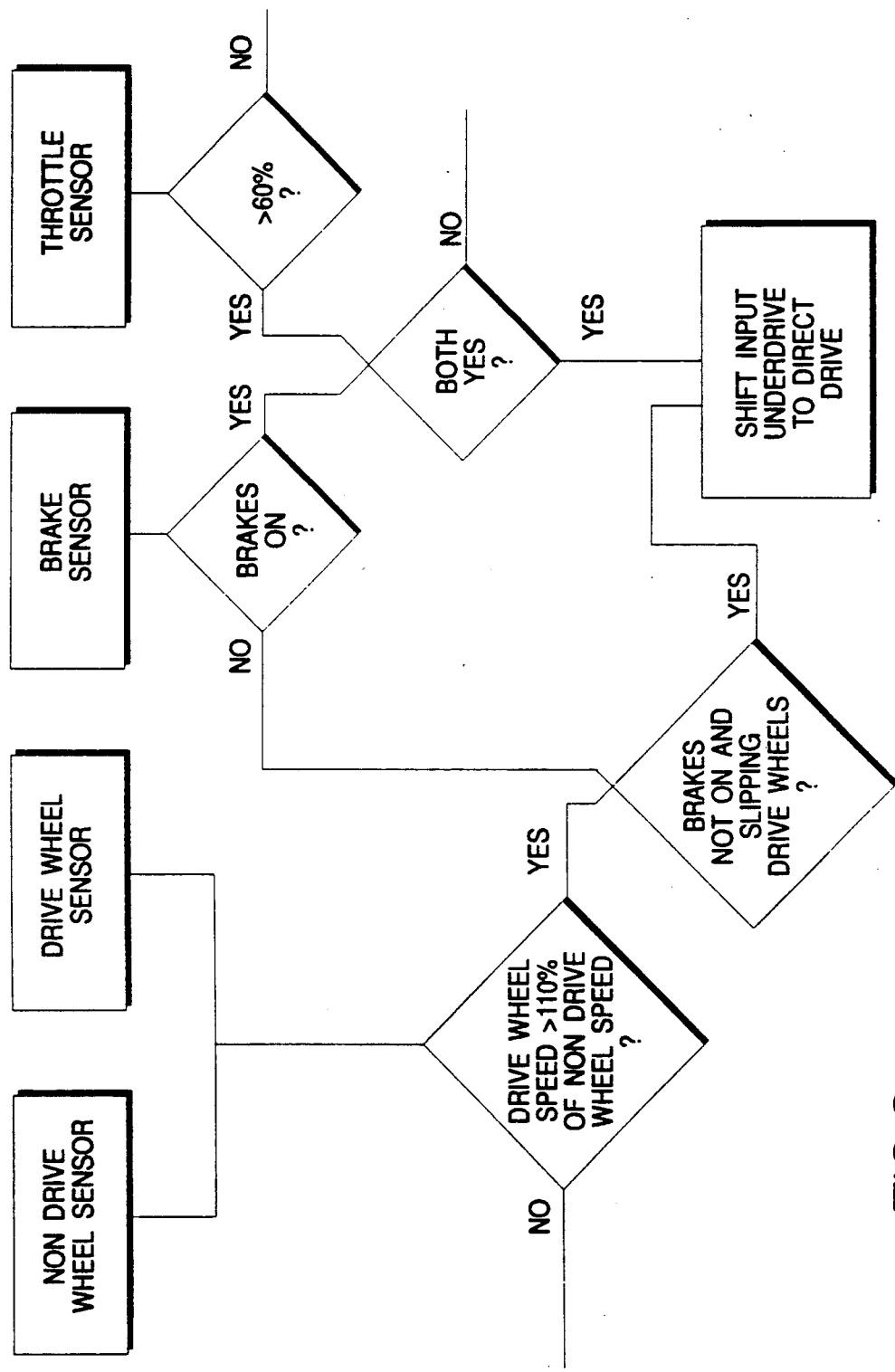
FIG. 2 is a schematic representation of a portion of an algorithm for determining the operating conditions within a transmission.

To limit the torque ratio within the overall powertrain, an algorithm, such as that shown in FIG. 2, is operable to assist a conventional microprocessor in the transmission control 28 in maintaining the two-speed planetary gear arrangement 14 within the desired operating conditions. For example, the microprocessor in the transmission control 28 will have input signals from a throttle sensor, a brake sensor, a drive wheel sensor and a nondrive wheel sensor. If the brake sensor indicates that the brakes are applied and the throttle sensor indicates that the throttle position is open at greater than 60%, the transmission control 28 will engage the fluid-operated friction clutch 58 and ensure that the brake 56 is disengaged thereby placing the planetary gear arrangement 14 in the direct drive condition.

The control mechanism will also limit the tractive effort of the vehicle, such as excess tire slippage, will not occur and maximum vehicle performance can be obtained. Such a condition can occur when the coefficient of the pavement is reduced and/or the engine throttle condition demands a torque level greater than the tire and road friction coefficient are willing to accept.

Under these conditions, the drive wheels will slip relative to the road surface while the nondrive wheels will not slip. If the drive wheel speed exceeds the nondrive wheel speed by 10%, the transmission control 28 will condition the planetary gear arrangement 14 for the direct drive condition, thereby reducing the overall torque ratio of the powertrain.

It should be appreciated that the transmission control 28 can upshift the two-speed planetary gear arrangement 14 during any operating gear ratio first through fourth or reverse in the multi-speed planetary gear arrangement 18. Therefore, if the wheel slip condition should occur in second or third, for example, the two-speed planetary gear arrangement 14 will be upshifted to reduce the overall torque ratio.

Under normal operating conditions, the upshifting of the two-speed planetary gear arrangement 14 would occur after the multi-speed planetary gear arrangement 18 has achieved its highest speed ratio condition, which in this embodiment, is shown as fourth gear.

Figure 3A:
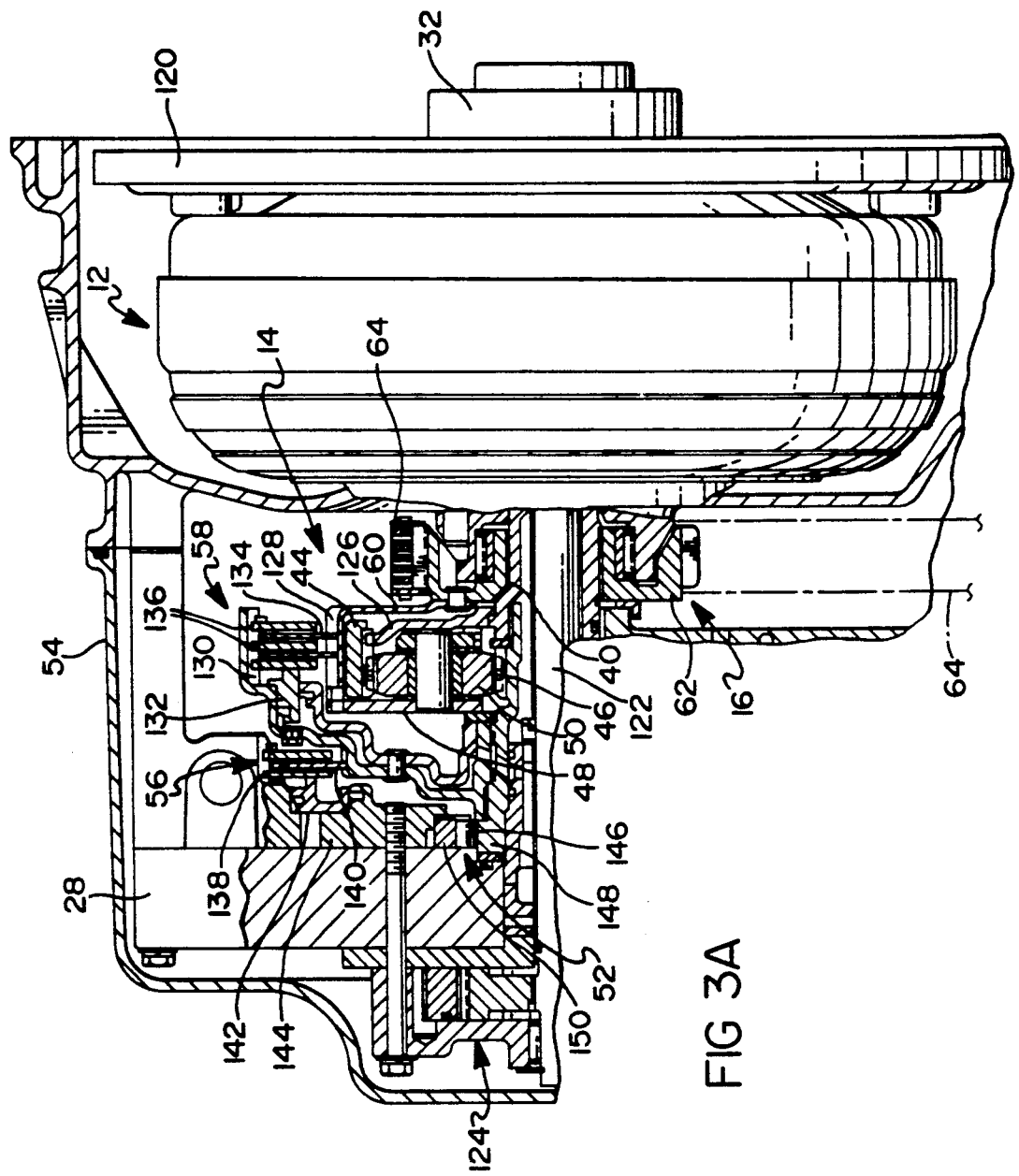

Shown in FIGS. 3A and 3B is a side elevational view, partly in section, of a portion of the powertrain represented schematically in FIG. 1. In FIG. 3A, it can be seen that the shaft 32 of the engine 10 is drivingly connected through a flexplate coupling 120, which in turn drives the torque converter 12. The torque converter 12 has a secondary or torque shaft 122 which is drivingly connected to a conventional positive displacement fluid pump 124 effective to supply fluid pressure to the transmission control 28.

As seen in FIG. 3A, the torque converter output shaft 40 is a sleeve shaft which has secured thereto a hub 126 which is drivingly connected to the ring gear 44. The clutch 58 includes an inner hub 128 and an outer hub 130 which are drivingly connected to the carrier 48 and sun gear 46, respectively. A fluid-operated piston 132 is selectively pressurized to cause engagement of friction plates 134 and 136 which are connected to the hubs 128 and 130, respectively.

This is a conventional fluid-operated friction clutch assembly. The brake assembly 56 has friction plates 138 drivingly connected to the casing 54 and another friction plate 140 drivingly connected with the sun gear 46. A fluid-operated piston 142, which is slidably disposed in a housing 144, is selectively pressurized to control the engagement and disengagement of the brake 56. The one-way device 52 is comprised of a plurality of rollers, such as 146, which are disposed between a hub 148 and an outer race 150 secured to the sun gear 46 and housing 144, respectively.

This mechanism can be controlled to establish the underdrive ratio through the one-way device 52 or the selective actuation of the brake 56 to establish the low speed, high torque ratio, or by the selective engagement of clutch 58 to provide the direct drive ratio. The sprockets 62 and 66, seen in FIGS. 3A and 3B, respectively, are interconnected by the chain 64 to provide input drive to the multi-speed planetary gear arrangement 18, as described above.

As is well known, the sprockets 62 and 66 can be chosen to provide an underdrive, a 1:1 drive or an overdrive between the two-speed planetary gear arrangement 14 and the shaft 68. If, for example, the sprocket 62 has a larger diameter than the sprocket 66, an overdrive condition will occur.

As seen in FIG. 3B, the band brake 108 is a conventional double-wrap band, such that high braking performance can be achieved regardless of the direction of rotation of drum 152 that the band brake 108 will engage. The band brake 112 is a single-wrap band, since its operation is only required to retard the rotation of a drum 154 in one direction during the transmission of significant torque loads.

It should be appreciated from the foregoing description that the overall torque capacity of the powertrain can be controlled within limits while expanding the operating performance of a four-speed power transmission to that of a five-speed power transmission without increasing the design torque requirements of the various torque transmitting elements within the transmission.

For example, it is possible to have a conventional four-speed transmission having a first gear ratio of 2.96 and an overdrive ratio of 0.68, and through the use of an added underdrive two-speed planetary gear unit, to increase the low speed ratio to 4.085 without affecting the maximum or overdrive ratio of 0.68. Since it is possible to operate the two-speed planetary gear set in the direct drive, the original drive ratios of 2.96, 1.62, 1.0 and 0.68 will always be available for use during various operating requirements. However, with the added planetary arrangement, it is possible to provide ratios of 4.085, 2.24, 1.38, 0.94 and 0.681.

This provides the operator with an expanded range of controls and ratios within which vehicle performance can be tailored for the specific requirements.

The embodiments of the invention in which an exclusive property or privilege is claimed are defined as follows:

1. A multi-speed power transmission in a vehicle having an engine for delivering power to the transmission and brakes for retarding motion of the vehicle, said transmission comprising: a torque converter connected to receive power from the engine; a planetary gear set connected to receive torque from the torque converter and including means selectively controllable to establish a first ratio for increasing the torque from the torque converter and to establish a second ratio for providing a 1:1 torque transfer; planetary gear means connected between said planetary gear set and at least one drive wheel of the vehicle for providing at least four torque ratios between the engine and the drive wheel, said drive wheel being retarded by operation of the brakes; and control means for shifting said planetary gear set from the first ratio to the second ratio in response to operation of the brakes to thereby reduce the torque transmitted to the planetary gear means.

2. A multi-speed power transmission in a vehicle having an engine for delivering power to the transmission, means for sensing wheel slip and brakes for retarding motion of the vehicle, said transmission comprising: a torque converter connected to receive power from the engine; a planetary gear set connected to receive torque from the torque converter and including means controllable to selectively establish a first ratio for increasing the torque from the torque converter and a second ratio for providing a 1:1 torque transfer; planetary gear means connected between said planetary gear set and at least one drive wheel of the vehicle for providing at least four torque ratios between the engine and the drive wheel, said drive wheel being retarded by operation of the brakes; and control means for shifting said planetary gear set from the first ratio to the second ratio in response to a signal from said wheel slip sensing means to thereby reduce the torque transmitted to the planetary gear means.

* * * * *